United States Patent

Kuan

[11] Patent Number: 5,180,405
[45] Date of Patent: Jan. 19, 1993

[54] OILY SMOKE PURIFYING APPARATUS OF CENTRAL PROCESSING SYSTEM TYPE

[75] Inventor: Chen Kuan, Taipei, Taiwan

[73] Assignee: Chi Chang Enterprises Co., Ltd., Taipei, Taiwan

[21] Appl. No.: 895,722

[22] Filed: Jun. 9, 1992

[51] Int. Cl.⁵ .................. B01D 47/12; B01D 53/04
[52] U.S. Cl. .......................... 55/227; 55/80; 55/89; 55/257.1; 55/259; 55/279; 55/316
[58] Field of Search ............ 55/89, 227, 228, 80, 55/257.1, 257.2, 257.3, 259, 279, 316

[56] References Cited

U.S. PATENT DOCUMENTS

| | | | |
|---|---|---|---|
| 2,585,440 | 2/1952 | Collins | 55/227 X |
| 3,487,620 | 1/1970 | Klein et al. | 55/222 |
| 3,972,678 | 8/1976 | Nakshbendi | 55/259 X |
| 4,124,021 | 11/1978 | Molitor | 55/228 X |
| 4,902,316 | 2/1990 | Giles et al. | 55/316 X |

Primary Examiner—Charles Hart
Attorney, Agent, or Firm—Varndell Legal Group

[57] ABSTRACT

An oily smoke purifying apparatus of central processing system type comprising an upright housing on the inside bottom of which is provided a water tank equipped with a water pump that is connected to a multitude of branch pipes capable of spraying a screen of water so that the space between these pipes and a slant catch plate located under the pipes forms a cooling chamber. As oily smoke is drawn into the cooling chamber by the fans located in the upper portion of the housing, oil and steam are separated; the oily mud dropping into the water tank and then being collected in the waste oil tank, the steam being exhausted via the upper portion of the housing after being multiply filtered.

4 Claims, 2 Drawing Sheets

OILY SMOKE PURIFYING APPARATUS OF CENTRAL PROCESSING SYSTEM TYPE

FIELD OF THE INVENTION

The present invention relates to an oily smoke purifying apparatus, particularly to an oily smoke purifying apparatus suitable for a central food preparation system and capable of exhausting clean air after the oily smoke inhaled being filtered.

BACKGROUND OF THE INVENTION

Average hotels or restaurants generally adopt a central food preparation system of which the kitchen has much higher service frequency and a larger quantity of exhausted oily smoke than those of an average family kitchen.

Conventionally, the oily smoke yielded from a central food preparation system is conducted by simple air conduits and exhausted to the outdoors. The work to install such a smoke exhausting apparatus is usually troublesome and time-consuming. More important, the conventional air conduit merely guides oily smoke to the outdoors atmosphere. This leads to the pollution of the building appearances and makes buildings badly ugly in the long run. Moreover, directly to release oily smoke will bring severe contamination to the nearby environment. Nowadays, the sense of environment protection is rapidly promoted. The situation of contamination has got to be improved.

SUMMARY OF THE INVENTION

It is the principal object of this invention to provide an oily smoke purifying apparatus especially suitable for a central food preparation system. In order to achieve this object, there is provided a construction in which the oily smoke from a kitchen is first inhaled to the housing and then cooled in the cooling chamber by a sprayed water screen. Due to the larger specific gravity, the grease deposits on a preset inclined plate and then flows to the surface of the circulating water. Being urged by the blade wipers of a conveyor, the grease floating on the water surface is collected in a waste oil tank located in a corner of the housing. In addition, the steam in the inhaled oily smoke rises straight up, through the moisture separation plate and the filtering layers for multiply filtering, and then is finally exhausted to the outside. With this arrangement, the apparatus according to the present invention provides not only the convenience for installation but also the capability of effectively filtering the oily smoke yielded from a central food preparation system so as to prevent the contamination of oily smoke to buildings and the environment. This is the chief motive of this invention.

The novelty and the other advantages of the present invention will become clear from the following detailed description when read in conjunction with the accompanying drawings.

DETAILED DESCRIPTION

Figure 1:
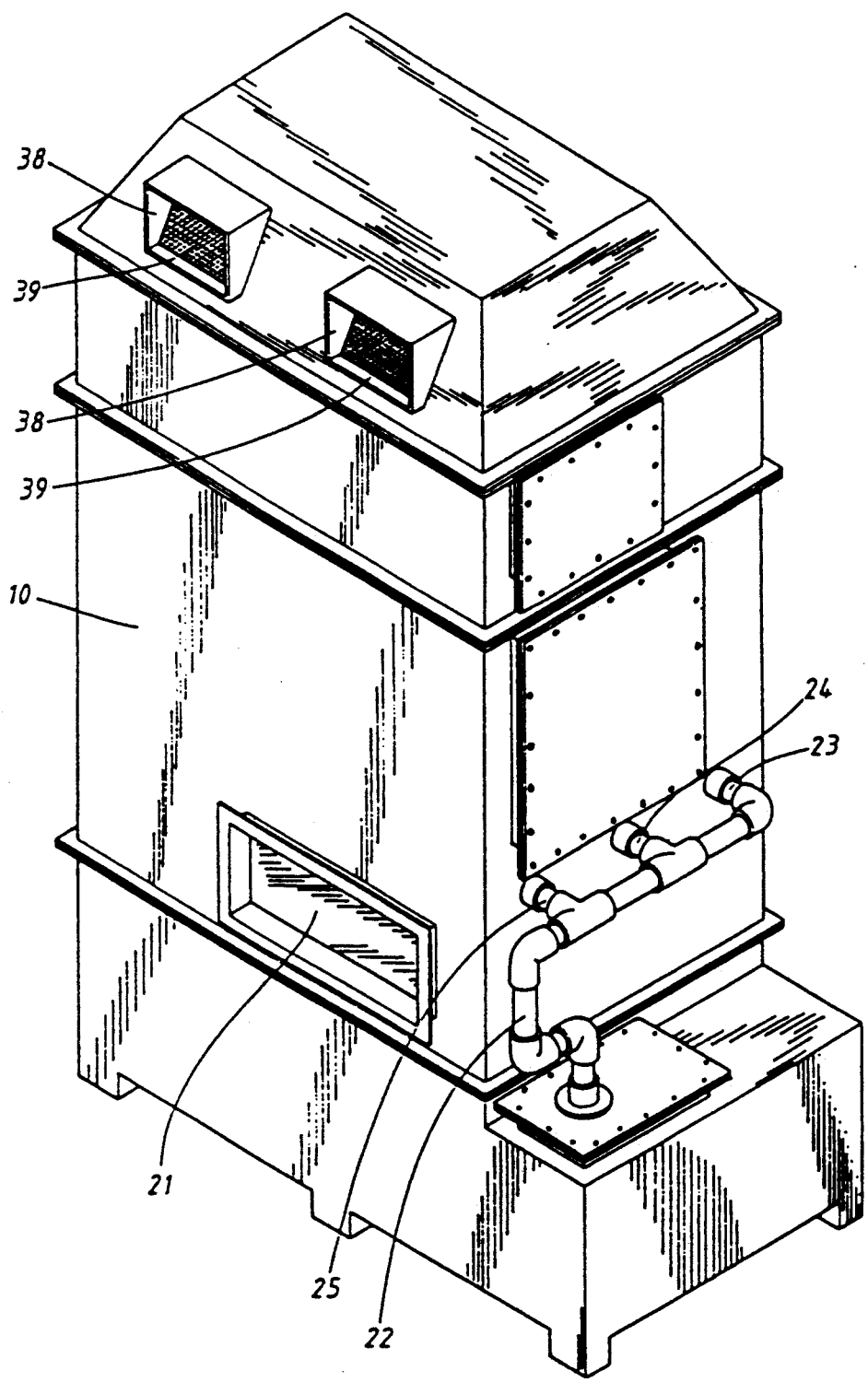
FIG. 1 is a perspective view showing a practical example of this invention in application.
Figure 2:
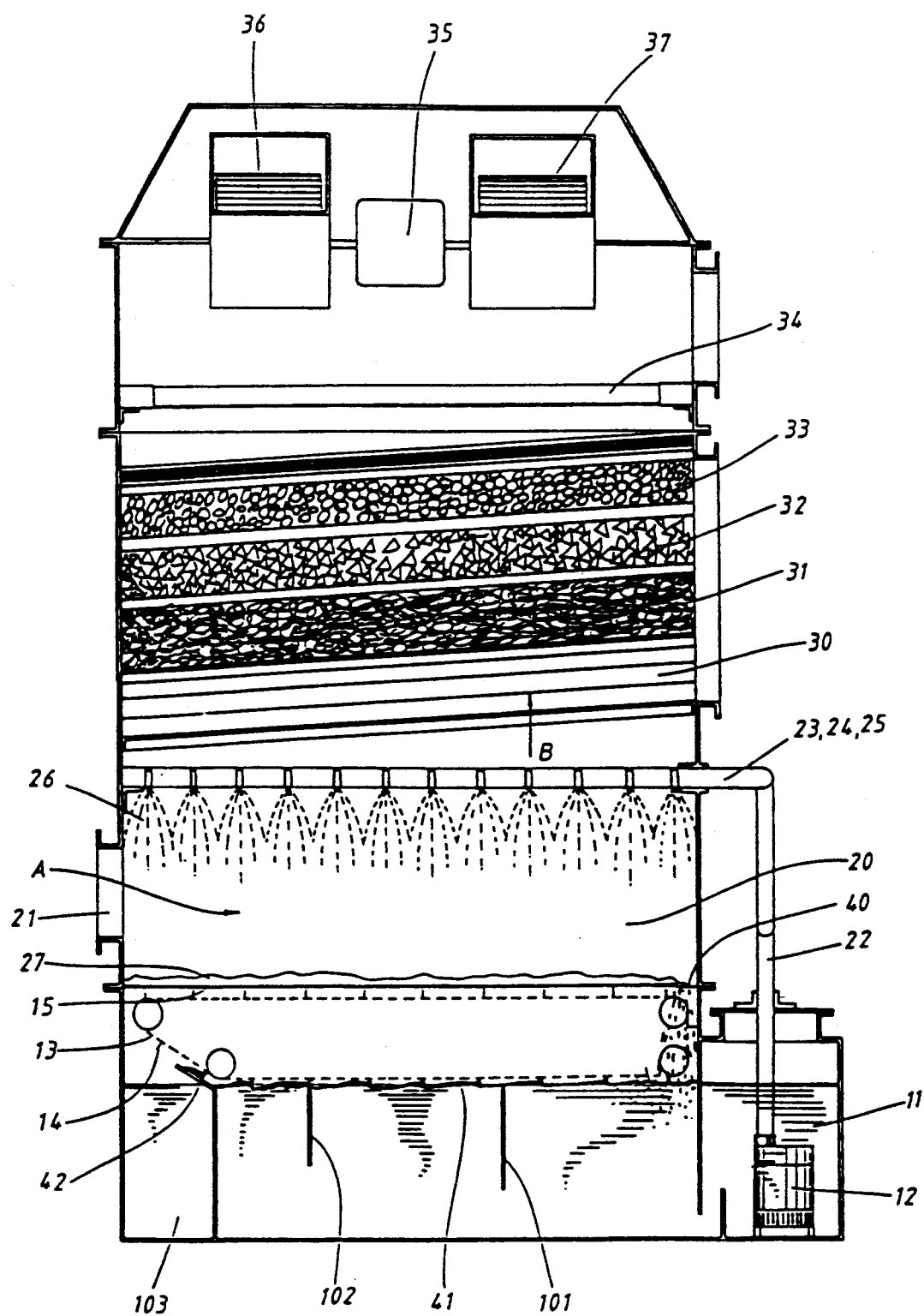
FIG. 2 is a schematic plan view illustrating the constitution of the example shown in FIG. 1.

Referring to the embodiment shown in FIGS. 1 and 2, the illustrated oily smoke purifying apparatus generally includes an upright housing 10 on the inside bottom of which is mounted a water tank 11 wherein there are provided a water pump 12, two wave plates 101, 102 separately fixed, and a waste oil tank 103 located in a corner of the housing. A conveyor 13 is installed above the water level of the water tank 11 on which conveyor there are mounted many projecting blade wipers equidistantly separated. Above the conveyor is an inclined catch plate 15.

In the portion of the housing above the inclined catch plate 15 is formed a cooling chamber 20 of appropriate size so that the smoke intake 21 is located on the side wall of the cooling chamber 20.

A vertical conduit 22 extended to the outside of the housing connects the foregoing water pump 12 to a multitude of branch pipes 23, 24, 25 that extend into the housing at the height a little more than that of the smoke intake 21 and can spray a water screen 26 in the cooling chamber 20 by means of the water pressure supplied by the water pump 12.

In the portion of the housing above the aforementioned branch pipes 23, 24, 25 there are arranged a moisture separation plate 30, a plastic fiber layer 31, a coke layer 32, and an active carbon layer 33 from the lower to the upper. Still further above the active carbon layer 33 is mounted an ultraviolet light tube 34. On the top of the housing are the fans 36, and 37 driven by the motor 35 by which oily smoke is drawn and exhausted from the outlet 38 through the filtering screen 39.

On the basis of the construction as described above, the oily smoke cleaning apparatus works as follows.

As the water pump 12 and the motor 35 are each activated, the water pump 12 continuously circulates the water in the water tank 11 by the way of drawing water to the branch pipes 23, 24, 25 that spray a water screen 26 in the cooling chamber 20. Meanwhile, the motor 35 drives the fans 36, 37 to inhale oily smoke from the smoke intake 21 in the direction indicated by the arrow head A.

The hot oily smoke entering the cooling chamber 20 is cooled by a water screen 26, of which the heavier grease 27 is condensed and drops on the surface of the inclined catch plate 15. The liquefied grease will move to the right of FIG. 2 due to the gradient of the inclined catch plate 15 and finally fall into the water tank 11 through a preset opening 40 that is formed between the inclined catch plate 15 and the inside wall of the housing. The blade wipers 14 of a continuously running conveyors urge gradually the greasy mud 41 floating on the water surface to the left. After passing through a preset upswept bent side plate 42, the greasy mud eventually falls into the waste oil tank 103 provided in one corner of the housing.

However the lightweight steam, separated from the oily smoke being cooled by sprayed water, rises up along the direction of the arrow head B and passes through a bent moisture separation plate 30 that is obliquely set. A part of the steam forms water drops thereon, continuously falling into the water tank along the moisture separation plate. Other gases continue to go through the plastic fiber layer 31 and the coke layer 32 for filtering smoke and the active carbon layer 33 for deodorization. After being disinfected by the ultraviolet ray, the clean air is exhausted to the outside via the outlet 38 and the filtering screen 39.

Not only is this invention convenient for the installation in the kitchen of a central processing system but also it eliminates the shortcomings of a conventional air conduit that can just guide oily smoke to the outside. It can completely purify a large quantity of oily smoke from a central kitchen so that the exhausted gases will not contaminate the surroundings any more.

As the described above, this whole configuration of this invention is a brand-new innovation to an existing oily smoke exhausting device for a central kitchen and can virtually improve the pollution of oily smoke to the environment. It is indeed a new and useful invention.

What is claimed is:

1. An oily smoke purifying apparatus of central processing system type including:
    a water tank provided on the inside bottom of the housing which is filled with water of an appropriate level;
    a water pump installed in said water tank;
    a conveyor equipped with many projecting blade wipers installed along the water surface;
    an inclined catch plate fixed above the conveyor;
    a conduit extending to the outside and connecting said water pump to several branch pipes which extend into the housing from the outside and spray a water screen in the housing, forming a cooling chamber between the branch pipes and the inclined catch plate so that the smoke intake is located on the side wall of the cooling chamber;
    a moisture separation plate, a plastic fiber layer, a coke layer and an active carbon layer provided in the portion of the housing above the branch pipes in an upward sequence;
    an ultraviolet light tube mounted over the active carbon layer;
    a fan set and a motor installed above the ultraviolet light tube in the upper portion of the housing where is connected to the outlet on the top of the housing and which fan set is driven by the motor; and characterized in that said fan set draws oily smoke to the cooling chamber where steam and oil are separated; greasy mud falling to the water surface beneath and being collected to the waste oil tank in a corner of the housing, steam passing through the upper portion of the housing and being exhausted to the outside.

2. An oily smoke purifying apparatus of central processing system type as claimed in claim 1, wherein between the inclined catch plate and a portion of the inside wall of the housing is formed an opening through which the greasy mud along the slope of the catch plate flows to the water tank.

3. An oily smoke purifying apparatus of central processing system type as claimed in claim 1, wherein in the upper portion of one side of the waste oil tank is provided an upswept bent plate able to collect the greasy mud in the waste oil tank, in cooperation with the projecting blade wipers of the conveyor.

4. An oily smoke purifying apparatus of central processing system type as claimed in claim 1, wherein the moisture separation plate is installed in an inclined and bent way for effectively guiding condensed water falling.

* * * * *